United States Patent [19]

Lugaresi

[11] Patent Number: 4,575,591
[45] Date of Patent: Mar. 11, 1986

[54] JOYSTICK ATTACHMENT FOR A COMPUTER KEYBOARD

[76] Inventor: Thomas J. Lugaresi, 4715 Hacienda Ave., Campbell, Calif. 95008

[21] Appl. No.: 602,825

[22] Filed: Apr. 23, 1984

[51] Int. Cl.$^4$ .......................... A63F 9/00; H01H 25/00
[52] U.S. Cl. .................................. 200/6 A; 179/90 A; 200/330; 235/146; 273/85 G; 273/148 B; 340/709
[58] Field of Search ................. 200/6 A, 153 K, 330, 200/340, 17 R, 18; 273/148 B, 85 G, DIG. 28; 179/90 A, 90 AT, 90 K, 90 CS; 74/471 XY; 400/472, 473; 235/145 R, 146; 364/709

[56] References Cited

U.S. PATENT DOCUMENTS

| | | | |
|---|---|---|---|
| 3,401,240 | 9/1968 | Groves | 200/6 A X |
| 3,950,634 | 4/1976 | Speiser | 235/145 R |
| 4,020,328 | 4/1977 | Bradam | 235/146 |
| 4,029,915 | 6/1977 | Ojima | 200/340 X |
| 4,124,787 | 11/1978 | Aamoth et al. | 200/6 A |
| 4,135,074 | 1/1979 | Malacheski | 200/330 |
| 4,158,130 | 6/1979 | Speraw et al. | 235/146 |
| 4,349,708 | 9/1982 | Asher | 200/153 K X |
| 4,394,548 | 7/1983 | Dola | 200/6 A |
| 4,401,864 | 8/1983 | Ichikawa | 200/153 K X |
| 4,414,438 | 11/1983 | Maier et al. | 200/6 A |
| 4,439,648 | 3/1984 | Reiner et al. | 200/6 A |
| 4,480,103 | 10/1983 | Smith III | 200/6 A |
| 4,486,629 | 12/1984 | Sledesky | 200/6 A |

FOREIGN PATENT DOCUMENTS

| | | | |
|---|---|---|---|
| 2819713 | 11/1978 | Fed. Rep. of Germany | 235/145 R |
| 54-121852 | 9/1979 | Japan | 273/DIG. 28 |

*Primary Examiner*—J. R. Scott
*Attorney, Agent, or Firm*—Paul L. Hickman

[57] ABSTRACT

A joystick attachment for a computer keyboard which includes a bracket on which is supported a housing for a joystick assembly, the bracket being detachably mounted on a computer keyboard having a plurality of keys arranged in a rectangular array with the joystick assembly in over lying, spaced-apart relationship with the array, the joystick assembly including an upstanding handle projecting upwardly through an opening in the housing and supported on the bracket for universal pivotal movement together with a plurality of circumferentially spaced actuating arms each operatively associated with one of said keys and movable selectively by the handle against a yieldable member from an inoperative position into an operative position into an operative position for depressing engagement by the arm with an associated key in the array.

19 Claims, 12 Drawing Figures

U.S. Patent   Mar. 11, 1986   Sheet 1 of 3   4,575,591
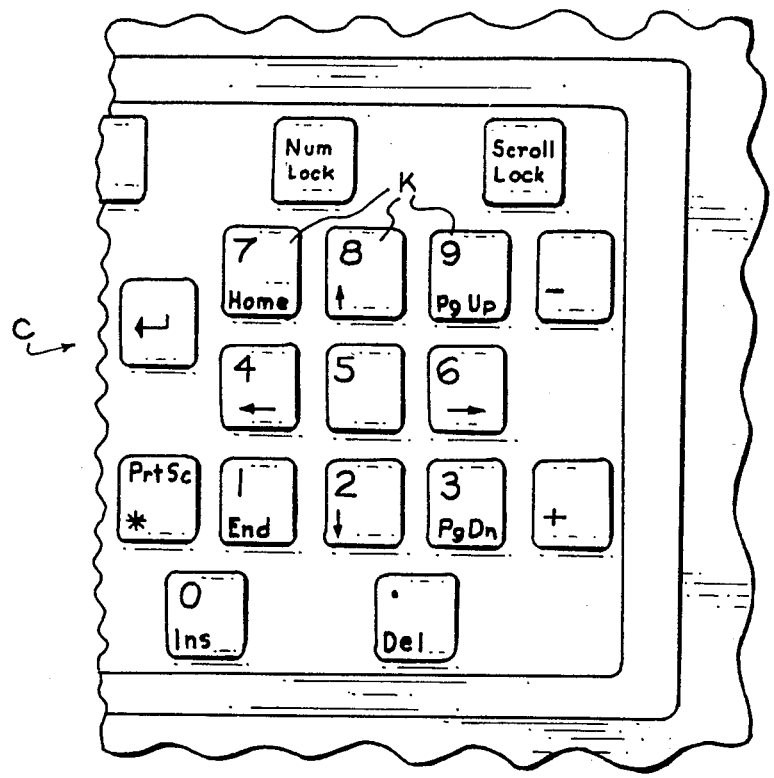
FIG-1-
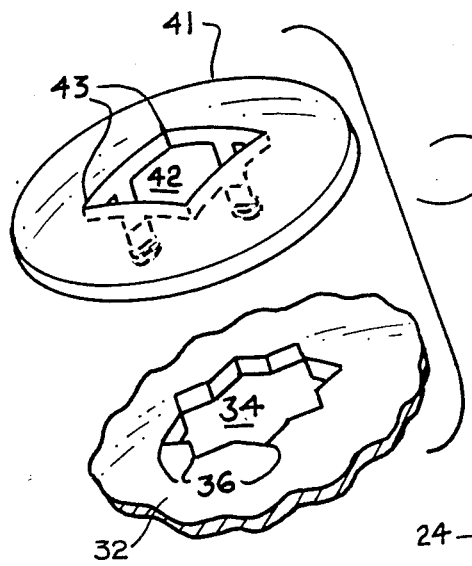
FIG-3-   FIG-4-
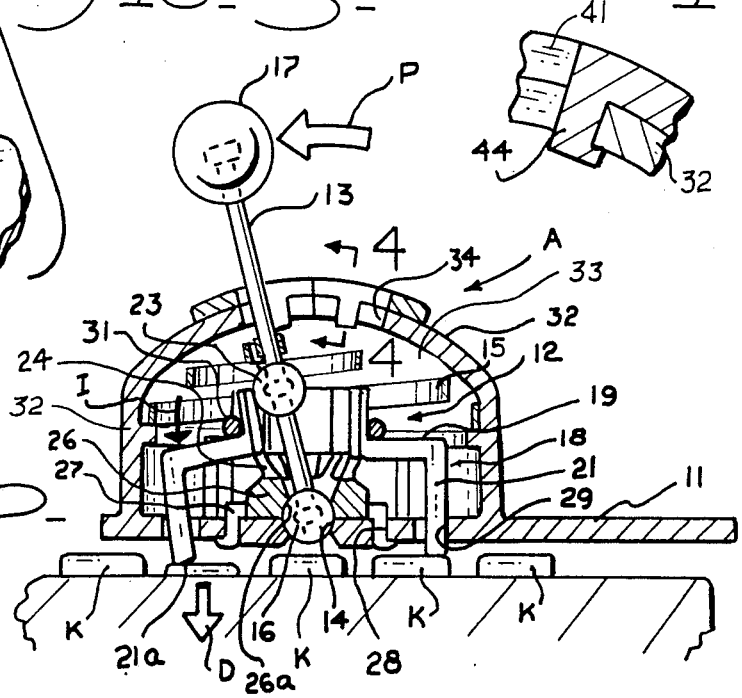
FIG-2-

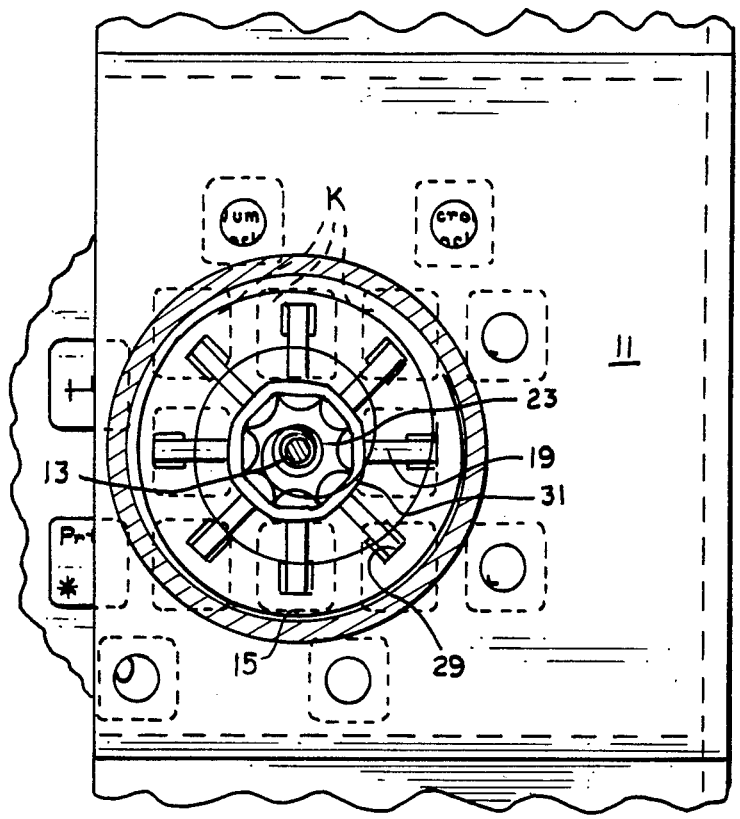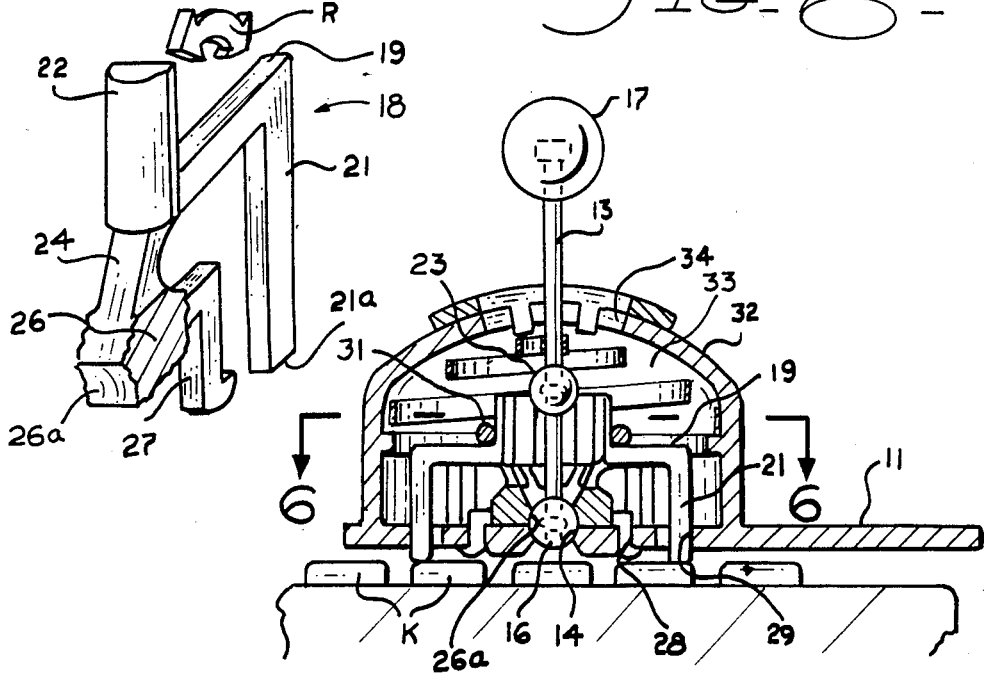

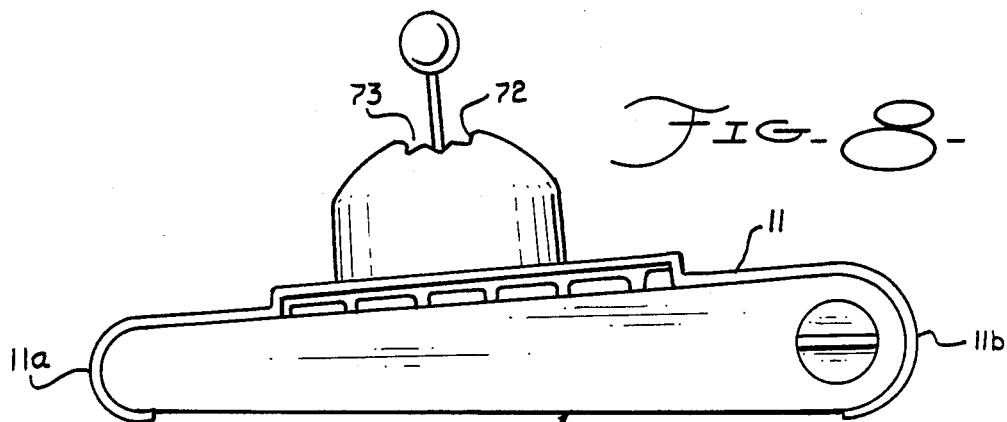
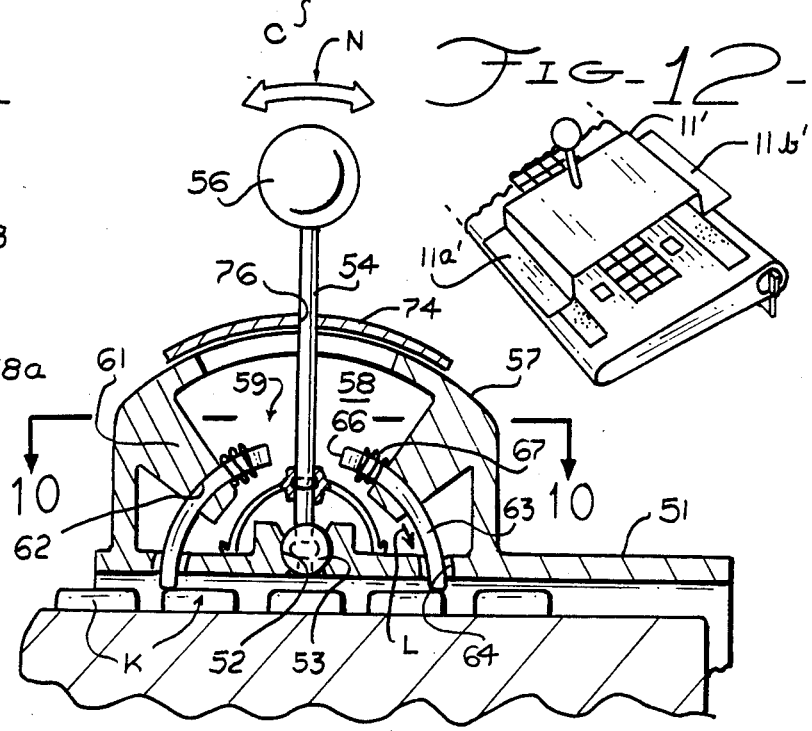
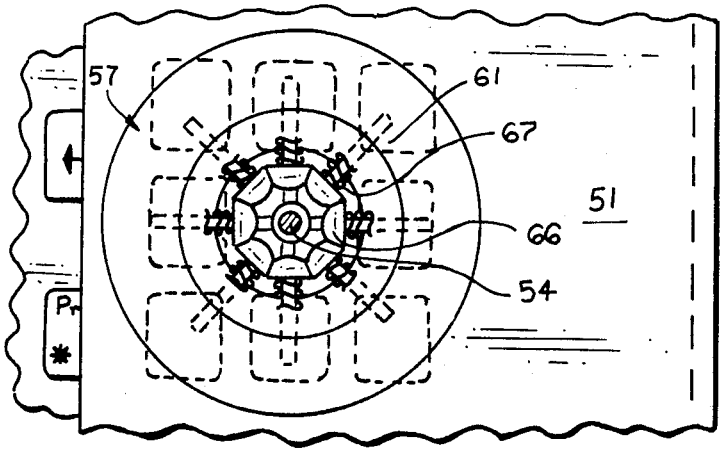

JOYSTICK ATTACHMENT FOR A COMPUTER KEYBOARD

BACKGROUND OF THE INVENTION

1. Field of the Invention

This invention relates to computer keyboards and more particularly to a joystick attachment for such a keyboard which permits selected keys on the keyboard to be actuated by means of the joystick.

2. Description of the Prior Art

Computer keyboards are commonly provided with a plurality of keys which are actuated by an operator to initiate certain computer functions. By way of example, a number of keys are arranged on the right hand portion of the typical keyboard in a rectangular array somewhat segregated from the main group of keys for subsidiary operations. Commonly, this rectangular array of keys includes keys which move the cursor in four directions, i.e., up, down, right and left. This rectangular array of keys is called upon frequently during the data entry operations by the operator, requiring the operator's attention to be directed away from the main body of keys. In the manipulation of this array of keys, the operator generally must seek the desired key within the array to be depressed interrupting somewhat the data entry flow of work. This subsidiary operation is particularly burdensome and time consuming when the cursor is to be moved as the proper directional arrows on the cursor keys must be identified and then carefully depressed, thus inhibiting the production rate of the operation.

The following patents are representative of the prior art to which the subject invention pertains, all of which are clearly distinguishable, both structurally and functionally, from the apparatus of applicant's invention:

| | |
|---|---|
| 4,124,787 | Aamoth et al |
| 4,382,162 | Metz |
| 4,394,548 | Dois |
| 4,309,582 | Coors |

The Aamoth et al patent is directed to a joystick controller assembly wherein the joystick is moved in response to x-y manual movements to move operating arms which press against and activate related switches.

Metz relates to a telephone attachment which fits over the keyboard of a pushbutton telephone for converting from the telephone push button format to a calculator push button format. Individual levers transmit the movement of the calculator push button to the telephone push buttons.

Dois teaches a joystick having a plunger attached to a contact carrying support member which, during movement of the joystick, provides engagement with a contact carrying base member.

Coors is directed to a controller having a handle provided with a push rod having a collar for displacing a switch operator during operation of the push rod thereby operating a switch.

SUMMARY OF THE INVENTION

Accordingly, a primary object of this invention is to provide a new and novel joystick attachment for a computer keyboard.

Another object of this invention is to provide a new and novel joystick attachment which may be simply and easily mounted detachably on a wide variety of computer keyboards.

A further object of this invention is to provide a new and novel joystick attachment for a portion of a computer keyboard which permits the keys controlling the cursor movement to be depressed in a joystick manner without viewing the keys.

Still another object of this invention is to provide a new and novel joystick attachment for a computer keyboard for joystick control of a rectangular array of keys adjustably from four to eight keys or more.

A still further object of this invention is to provide a new and novel joystick attachment for a computer keyboard which is simple and inexpensive in construction and in which the joystick is self-returned to a neutral position.

The objects stated above and other related objects of the invention are accomplished by the provision of a base member on which a joystick assembly is mounted with means for detachably mounting the base member on a computer keyboard having a plurality of keys arranged in a rectangular array with the joystick assembly positioned in overlying, spaced-apart relationship with the array of keys. The joystick assembly includes an upstanding handle mounted at its lower end for free pivotal movement on the base member. A plurality of circumferentially spaced actuating arms are mounted on the base member adjacent the handle for movement between an inoperative position and an operative position for depressing engagement with an associated one of the keys and means are provided for yieldingly urging the arms into the inoperative position. The handle is pivotally movable by an operator into engagement with a selected one of the arms to move the selected arm against the urging means into depressing engagement with an associated one of the keys.

Other objects and advantages of the invention will become apparent from the following description when considered in the light of the accompanying drawings.

BRIEF DESCRIPTION OF THE DRAWING

FIG. 1 is a is a plan view of a portion of a computer keyboard with which the joystick attachment of the invention is associated;

FIG. 2 is a sectional view of one embodiment of the joystick attachment of the invention in an operative position;

FIG. 3 is a perspective view of a portion of the joystick of FIG. 2;

FIG. 4 is an enlarged sectional view taken substantially along line 4—4 of FIG. 3 in the direction of the arrows;

FIG. 5 is a view similar to FIG. 2 showing the joystick attachment of the invention in an inoperative position;

FIG. 6 is a sectional view taken substantially along line 6—6 of FIG. 5 in the direction of the direction of the arrow;

FIG. 7 is an enlarged perspective view of another portion of the joystick attachment of FIG. 2;

FIG. 8 is an end view showing the joystick attachment of the invention mounted on the computer keyboard of FIG. 1;

FIG. 9 is a sectional view similar to FIG. 2 showing another embodiment of the joystick attachment of the invention;

FIG. 10 is a sectional view taken substantially along line 10—10 of FIG. 9 in the direction of the arrows;

FIG. 11 is an enlarged perspective view of a portion of the joystick attachment of FIG. 9; and FIG. 12 is a perspective view of a modification of the joystick attachment of the invention.

DETAILED DESCRIPTION OF THE PREFERRED EMBODIMENT(S)

Referring now to the drawings and to FIG. 1 in particular, there is shown a portion of a computer keyboard identified generally by the letter C with which the joystick attachment of the invention is associated. As is well known, the computer keyboard portion shown in FIG. 1 is the right hand portion which includes a plurality of keys identified generally by the letter K, a group of which are arranged in a rectangular array and identified by the numerals 1-9.

The joystick attachment of the invention designated generally in FIG. 2 by the letter A is adapted to be operatively associated with eight of the keys K in the rectangular array which includes keys 1-4 and 6-9, four of which, keys 2, 4, 6, 8, are utilized for cursor movement in the direction shown by the arrows on each of these keys.

Referring now to FIG. 2, the joystick attachment a includes a base member 11 on which a joystick assembly designated generally by the numeral 12, is mounted and means are provided for detachably mounting the base member 11 on the computer keyboard C with the joystick assembly 12 in overlying spaced-apart relationship with the array of keys K. More specifically, in one embodiment of the invention, the base member 11 includes arcuate end members 11a and 11b which are suitably shaped to conform to the edge portion of the computer keyboard C, the base member 11 being formed of suitable flexible material such as plastic for a snap-fit engagement of the end portions 11a and 11b with the computer keyboard C as shown in FIG. 8. In another arrangement (as seen in FIG. 12), the base member 11' may be provided having L-shaped end portions 11a' and 11b' having suitable means such as Velcro or the like, for detachably mounting the base member 11' on the upper face of the computer keyboard C.

Referring now again to FIG. 2, the joystick assembly 12 includes an upright handle 13, the lower end of which is mounted on the base member 11 by universal mounting means for freely pivotal movement. More specifically, a socket 14 is provided in the base member 11 for accommodating a ball 16 on the lower end of the handle 13, the upper end of the handle 13 being provided with a knob 17 for manual manipulation of the handle. A coil spring 15 is provided around handle 13 to bias the handle towards its vertical orientation. A plurality of circumferentially spaced actuating arms 18 are mounted on the base member 11 adjacent the handle 13 for movement between the inoperative position of FIG. 5 and the operative position of FIG. 2 for depressing engagement with an associated one of the keys K.

More specifically, in the preferred embodiment eight of such arms 18 are provided, each operatively associated with a respective one of the keys 1-4, 6-9, as shown best in FIG. 6. As shown in FIGS. 2, 5, and 7, each of the actuating arms 18 includes a portion of inverted L-shaped configuration having a horizontally extending leg 19 and a vertically extending portion 21 having a tip 21a for depressing engagement with an associated one of the keys K. The end of the leg 19 opposite the leg 21 is provided with an upstanding lug 22, arranged to be engaged by a ball 23 on the handle 13 in the operative position of FIG. 2. The lower end of the lug 22 is mounted by means of a web 24 of flexible material such as plastic or the like, to a support member 26 positioned on the upper surface of the base member 11 and having a arcuate portion 26a for rolling engagement with the handle of ball 16.

Each support member 26 includes a hook portion 27 which is adapted to be secured within an associated opening 28 in the base member 11, thereby maintaining the associated support member 26 and therefore the actuating arm 18 in the mounted position on the base member 11. As can be seen in FIGS. 2 and 5, the base member 11 is provided with a plurality of circumferentially spaced openings 29 for accommodating the lower end portion of the vertically extending leg 21 of a respective arm 18 during the movement of the arm 18 from the inoperative position of FIG. 5 to the operative position of FIG. 2. Means are provided for yieldingly urging the arms 18 into the inoperative position of FIG. 5, which in the illustrated embodiment with all of the lugs 22 on the arms 18, thereby yieldingly resisting the movement of the arms 18 from the inoperative position of FIG. 5 into the operative position of FIG. 2.

The joystick attachment of the invention includes a dome-shaped housing 32 having an interior 33 mounted on the base member 11 for accommodating the joystick assembly 12. Means are provided for limiting the movement of the handle 13 during engagement of the handle with selected one of the arms 18. More specifically, the upper portion of the housing 32 is provided with an opening 34 through which the upper end portion of the handle 13 projects and a plurality circumferentially spaced notches 36, as shown best in FIG. 3, are provided on the edge of the housing defining the openings 34, each of the notches 36 being associated with the respective one of the arms 18 for engagement by the handle 13 during the handle pivotal movement. As can be understood, eight of such notches 36 are provided, one for each of keys 1-4 and 6-9, each arranged to be engaged by the handle 13 during actuation of a respective one of the arms 18.

Thus, in the operation of the joystick attachment of the invention, the handle 13 is moved by the operator from the inoperative position of FIG. 5 in the direction of a selected one of the arms 18 so that the ball 23 engages the lug 22 on the selected arm pivoting it in the direction of the arrow I such that the selected arm 18 pivots on its flexible web member 24 moving the leg 21 through the opening 29 in the base member 11 into depressing engagement with the associated key K, and thus depressing the key K downwardly in the direction of the arrow D. At the same time the pivotal movement of the handle 13 engages the respective notch in the housing 32 limiting the movement of the handle 13 and when the handle 13 is released, the O-ring 31 urges the pivoted arm back to the inoperative position.

The joystick attachment of the invention is further adapted to limit the movement of the handle 13 in the direction of the arrow P of FIG. 2, for the actuation of four keys for cursor movement such as keys 2, 4, 6 and 8. Such additional handle movement limiting means further includes a template 41 as shown in FIG. 3, which is in the form of a disc suitably shaped to conform to the contour of the upper portion of the housing 32 as shown in FIG. 2. The template 41 includes a central opening 42 having a rectangular shaped configuration operatively associated with a respective one of the keys 2, 4, 6 and 8. Means are provided on the template 41 for detachably mounting the template on the housing 32 with the template central opening 42 in axial alignment with the housing upper opening 34.

More specifically, as shown best in FIG. 4, the template is provided with a plurality of downwardly depending hook portions 44 which are arranged to engage the edge of the housing 32 defining the opening 34 in gripping engagement. Thus, by means of the removable template 41, the handle 13 may be pivoted by the operator in a selected direction towards a selected one of the notches or corners 43 corresponding to one of the keys 2, 4, 6 and 8. As can be seen best by reference to FIG. 7, the reciprocal movement of the arms 18 is identified by the double arrow R in FIG. 7.

Referring now to FIGS. 9–12, there is shown another embodiment of the joystick attachment of the invention which may be detachably attached to a computer keyboard C as in the previous embodiment, and which functions in substantially the same way for selective actuation of the keys K. As shown best in FIG. 9, the joystick attachment includes a base member 51 arranged to be detachably mounted on the computer keyboard C as in the previous embodiment such as shown in FIGS. 8 and 12. The base member 51 includes a socket 52 for accommodating a ball 53 on the lower end of the handle 54, the upper end of which is provided with a ball 56 for manual manipulation of the handle 54 by the operator. A housing 57 is provided on the base member 51 preferably formed integrally therewith and defining an interior 58 within which a joystick assembly 59 is disposed. The inner wall of the housing 57 is provided with a plurality of circumferentially spaced, inwardly directed extensions 61, each provided with an arcuate aperture 62, for accomodating an actuating arm in the form of an arcuate member 63 also disposed in a circumferentially spaced relationship around the handle 54 in operative association with a respective one of the keys 1–4 and 6–9, respectively.

As in the previous embodiment, a plurality of circumferentially spaced openings 64 are provided in the base member 51, each associated with a respective one of the arcuate members 63 for accomodating the arcuate member 63 during its movement from the inoperative position of FIG. 9 in depressing engagement with the associated key K. Means are provided for yieldingly urging the arms or arcuate members 63 into the inoperative position of FIG. 9 which include a head 66 on the upper end of each of the arcuate members 63 and a spring 67 disposed on the arcuate member 63 between the associated extension 61 and head 66. Means are also provided in the embodiment of FIG. 9 for yieldingly urging the handle 54 into a substantially vertical position arranged in circumferentially spaced relationship and attached at their upper ends to a collar 69 as shown best in FIG. 11. The collar 69 includes a bore 71 for accommodating the handle 54 and the collar 69 is with the lower ends 68a in engagement with upper surface of the base member 51.

As in previous embodiment, means are provided for limiting the pivotal movement of the handle 54 during its pivotal movement from the inoperative position of FIG. 9. As shown best in FIG. 8, a plurality of notches 72 are provided on the edge of the upper portion of the housing 57 which defines an opening 73 through which the handle 54 extends. Preferably, a cap 74 having a central opening 76 is positioned on the handle 54 with the handle extending through the opening 76 thus, during the pivotal movement of the handle 54, the cap slides along the upper portion of the housing.

To actuate one of the keys K, the operator moves the joystick handle 54 in the desired direction in accordance with the key to be depressed and as defined by the corresponding notch 72 in the housing opening 73. As the handle 54 is pivoted in the selected direction as indicated by the double arrow N in FIG. 9, the handle engages the head 66 of the corresponding arcuate member 63, and the arcuate member slides in the direction of the arrow L through the corresponding base member opening 64 into depressing engagement with the associated key K compressing the spring 67. At the same time, the pivotal movement of the handle 54 is resisted by one or more the spring fingers 68 so that when the handle 54 is released by the operator, the handle is returned to the upright inoperative position of FIG. 4 together with the return of the arm 63 into the position shown in FIG. 9 by action of the spring 67.

The joystick attachment of the invention has been described in a simplified manner only to clarify the concept of the invention. Naturally, technicians in this field may carry out modifications and variations with the technology available without exceeding the limits and the spirit of the invention.

What is claimed is:

1. A joystick attachment for a computer keyboard having a plurality of keys arranged in a rectangular array comprising, in combination, a base member, a joystick assembly on said base memer, means for detachably mounting said base member on a computer keyboard with said joystick assembly in overlying spaced-apart relationship with said array of keys, said joystick assembly including an upstanding handle, universal mounting means on said base member engageable with the lower end of said handle, a plurality of circumferentially spaced actuating arms mounted on said base member adjacent said handle for movement between an inoperative position and an operative position for depressing engagement with an associated one of said keys, means for yieldingly urging said arms into said inoperative position, said handle being movable into engagement with a selected one of said arms to move said selected arm against said urging means into said depressing engagement with said associated one of said keys.

2. A joystick attachment in accordance with claim 1 including means for limiting the movement of said handle during engagement of said handle with a selected one of said arms.

3. A joystick attachment in accordance with claim 2 including a housing on said base member for accommodating said joystick assembly, the upper portion of said housing having an opening and wherein the upper end portion of said handle extends through said opening above said housing.

4. A joystick attachment in accordance with claim 3 wherein said means for limiting the movement of said handle includes a plurality of circumferentially spaced notches on the edge of said housing defining said opening, each of said notches being associated with a respective one of said arms for engagement by said handle during said handle pivotal movement.

5. A joystick attachment in accordance with claim 4 wherein said plurality of keys comprises an array of eight keys and wherein said plurality of actuating arms includes an actuating arm operatively associated with each of said eight keys.

6. A joystick attachment in accordance with claim 4 wherein said means for limiting the movement of said handle further includes a template having a central opening, means for detachably mounting said template on said housing with said template central opening in axial alignment with said housing upper opening and a plurality of notches on the edge of said template defining said central opening, said notches on said template being formed by the corners of a central opening having a rectangular-shaped configuration to permit said handle to engage said actuating arms associated with said keys corresponding to said central opening corners.

7. A joystick attachment in accordance with claim 4 wherein each of said arms includes a portion of inverted L-shaped configuration having a horizontally extending leg and a vertically extending leg having a tip for said depressing engagement with an associated one of said keys and wherein said base member is provided with a plurality of openings for accommodating the lower end portion of said vertically extending leg of a respective arm during said movement of said arm from said inoperative position to said operative position.

8. A joystick attachment in accordance with claim 7 wherein each of said arms includes an upstanding lug on said horizontally extending leg for engagement by said handle during said handle movement, a support member having a hook portion, flexible means for connecting said L-shaped portion to said support member, a plurality of further openings in said base member for receiving a respective one of said hook portions to retain said support member on said base member and wherein said means for yieldingly urging said arms into said inoperative position comprises resilient means engageable with all of said lugs.

9. A joystick attachment in accordance with claim 8 wherein said resilient means comprises an O-ring.

10. A joystick attachment for a computer keyboard having a plurality of keys arranged in a rectangular array comprising, in combination, a base member, a joystick assembly on said base member, means for detachably mounting said base member on a computer keyboard with said joystick assembly in overlying, spaced-apart relationship with said array of keys, said joystick assembly including an upstanding handle, universal mounting means on said base member engageable with the lower end of said handle for freely pivotal movement of said handle, a plurality of circumferentially spaced, actuating arms mounted on said base member adjacent said handle for movement between an inoperative position and an operative position for depressing engagement with an associated one of said keys, means for yieldingly urging said arms into said inoperative position, means for yieldingly urging said handle into a substantially vertical position, said handle being pivotally movable into engagement with a selected one of said arms to move said selected arm against said urging means into said depressing engagement with said associated one of said keys.

11. A joystick attachment in accordance with claim 10 including means on said joystick assembly for limiting the movement of said handle during said engagement of said handle with said selected one of said arms.

12. A joystick attachment in accordance with claim 11 including a housing on said base member for accommodating said joystick assembly, the upper portion of said housing having an opening and wherein the upper end portion of said handle is disposed with said opening above said housing.

13. A joystick attachment in accordance with claim 12 wherein each of said arms comprise an arcuate member, means on said housing for guiding the movement of said arcuate member between said inoperative position and said operative position and wherein said base member is provided with a plurality of openings for accommodating the lower portion of a respective one of said arms during said movement into said operative position.

14. A joystick attachment in accordance with claim 13 wherein said means for limiting the movement of said handle includes a plurality of circumferentially spaced notches in the edge of said housing defining said opening, each of said notches being associated with a respective one of said arms for engagement by said handle during said movement of said handle.

15. A joystick attachment in accordance with claim 14 wherein said plurality of keys comprise an array of eight keys and wherein said plurality of actuating arms includes an actuating arm operatively associated with each of said eight keys.

16. A joystick attachment in accordance with claim 14 including a disc having a central opening disposed in overlying sliding relationship with the upper portion of said housing and having a contour conforming to said housing upper portion and wherein said handle is accommodated within said central opening.

17. A joystick attachment in accordance with claim 14 wherein said means for yieldingly urging said handle into a substantially vertical position comprise a plurality of circumferentially spaced spring fingers fixed at one end to said handle within said housing, the other ends of said spring fingers being disposed in engagement with said base member.

18. A joystick attachment in accordance with claim 17 including a plurality of circumferentially spaced extensions on the inner wall of said housing, each of said extensions having an arcuately shaped aperture, each of said actuating arms comprising an arcuately shaped slide member slidably disposed in a respective one of said apertures, the upper end of said slide members having a head for engagement by said handle to move said slide member into said operative position and wherein said means for yieldingly urging said arms into said inoperative position include a spring on each of said slide members between said extension and said head.

19. A joystick attachment in accordance with claim 18 wherein said means for detachably mounting said base member on a computer keyboard includes at least one extension on said base member detachably engageable with a portion of said keyboard adjacent said array of keys.

* * * * *